3,725,080
COATING FORMULATIONS CONTAINING THE REACTION PRODUCT OF GLYCIDOL POLY-ETHERS AND SULFATING AGENTS

E. Scudder Mackey, Binghamton, N.Y., assignor to GAF Corporation, New York, N.Y.
No Drawing. Continuation-in-part of application Ser. No. 641,451, May 26, 1967. This application Feb. 1, 1971, Ser. No. 111,747

Int. Cl. G03c 1/38
U.S. Cl. 96—114.5                                    10 Claims

ABSTRACT OF THE DISCLOSURE

Coating aids for water-permeable colloid coating compositions comprising sulfate ester products of a glycidol polyether.

---

This application is a continuation-in-part of copending application Ser. No. 641,451 filed May 26, 1967 and now abandoned.

This invention relates to coating compositions comprising a water-permeable colloid and more particularly, to gelatin coating compositions advantageously adapted for use in connection with high-speed coating methods.

As is commonly recognized in the coatings industry, it is highly desirable, if not essential, that water-permeable colloid, e.g., gelatin, containing coating compositions be capable of application at relatively high coating speeds, and that the layers so deposited be of uniform and selected physical characteristics. The foregoing requirements are of primary import in operations associated with the preparation of photographic film elements. Ideally, coating aids contemplated for use in water-permeable colloid-containing compositions and especially those containing gelatin should:

(1) Be of uniform quality, properties, etc. from batch to batch;
(2) Enable the use of high-speed coating operations both in wet-on-wet and wet-on-dry coatings;
(3) Be devoid of any tendency to impart streakiness or repellency to the water-permeable colloid;
(4) Exhibit minimal sludge and/or foam formation;
(5) Produce coatings having little or no tendency to slip;
(6) Be non-photoactive.

Heretofore, considerable difficulty has been encountered in connection with attempts to provide water-permeable colloid layers of the desired characteristics while utilizing coating speeds which are consonant with feasible commercial operation and satisfactory product throughput. With gelatin compositions for example, and to which no auxiliary coating aid has been added, there are invariably obtained coated layers which exhibit manifold defects including, e.g., the presence of numerous crescent-shaped uncoated areas, also referred to as repellency spots, such defects approximating the size of a pinhead with streaks or other such irregularities emanating from the points of the crescent and proceeding in a direction opposite to that of the coating. It is not unusual to find that lightly coated areas of 5–10 mm. in diameter will result.

In an effort to overcome or otherwise mitigate the foregoing and related disadvantages, the art has resorted to the use of a variety of coating aids. Saponin for example, despite its relatively widespread use as a coating aid in gelatin compositions of various types has nevertheless proved somewhat unsatisfactory. Although yielding a relatively uniform and even coating, this material being of natural origin, may often vary markedly from batch to batch in quality, composition, purity and the like, to the extent that one or more of the properties required in the photographic emulsion may be deleteriously affected.

As a consequence, considerable attention has been focused on the use of synthetic coating aids selected from a wide variety of surfactant materials of the anionic, cationic, amphoteric and/or non-ionic types; including for example, the taurides, betaines, imidazolinium salts, and the like. Since materials of the latter type may be subjected to relatively precise conditions of manufacture, problems associated with variations in quality, composition, purity and the like are substantially eliminated. Despite the foregoing advantage, however, the synthetic coating aids heretofore provided have nevertheless proved unsatisfactory in a number of important respects. As examples of the more important difficulties repeatedly encountered with the use of the latter materials and especially in connection with the preparation of photographic layers containing gelatin, there may be mentioned their tendency to produce streakiness and repellency spots that cannot be readily rewet with the consequent condition that the product tends to form "airbells" on the emulsion surface during photographic processing. Such areas will often manifest themselves in the form of relatively small, undeveloped areas in the processed product due to the fact that in such areas the developer is incapable of penetrating into the emulsion layer. These defects are not only unsightly to the extent that retouching of the negative is often required, but more importantly, can be dangerously misleading when present on certain types of films particularly medical or industrial X-ray films.

The foregoing and related problems become increasingly manifest in connection with "wet-on-wet" coating methods wherein the water-permeable colloid composition is applied to a wet substrate. The latter is, of course, a matter of prime commercial importance and especially in connection with plural coating operations wherein it is of utmost importance to eliminate any necessity for drying and thus the time which would otherwise be consumed thereby.

However, with the use of the coating aids heretofore provided, the "one pass-wet-on-wet" technique is found to be substantially inapplicable and accordingly, it becomes necessary to dry an applied layer prior to the application of an additional overcoating layer.

Thus, a primary object of the present invention resides in the provision of improved gelatin coating compositions advantageously adapted for application to both wet and dry surfaces via the use of high speed coating techniques in the virtual absence of skipping.

A further object of the present invention resides in the provision of coating aids for use with photosensitive gelatin emulsion compositions to facilitate the attainment of coatings which are uniform and repellency-free without deleteriously affecting the emulsion.

Other and related objects of the present invention will become apparent hereinafter as the description thereof proceeds.

The attainment of the foregoing and related objects is made possible in accordance with the present invention which in its broader aspects includes the provision of improved water-permeable colloid coating composition and coated elements prepared therewith and wherein such compositions contain as an essential ingredient a relatively small amount of a coating aid comprising a sulfate ester of a glycidol polyether, the latter having the following general formula:

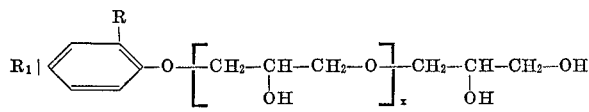

wherein R represents hydrogen or alkyl having from 1 to 18 carbon atoms, said alkyl group being either straight chain or branched; $R_1$ represents alkyl containing from 8 to 18 carbon atoms which, again, may be either straight chain or branched and $x$ represents a positive integer of from about 3 to about 30 inclusive and preferably from about 4 to about 20.

Although specific reference will be made to gelatin throughout the present description, the term water-permeable colloid as used herein is to be understood as encompassing water-soluble and/or dispersible materials whose aqueous solutions yield water-permeable films on drying. As particular examples of substances contemplated by the aforestated definition, there may be mentioned, without necessary limitation, the water-soluble cellulose esters of lactic or glycolic acid, partially hydrolyzed polyvinyl acetate, modified polyvinyl alcohol, water soluble polyvinyl acetals, etc. The colloid material may also be suitably provided in the form of an aqueous dispersion, emulsion suspension etc., such as would be the case with polymers derived from the polymerization of one or more acrylate monomers, e.g., ethylacrylate, methylmethacrylate, etc. Such polymeric substances are customarily provided in latex form by the use of suitable emulsifying agents, suspending agents, or the like.

The truly synergistic results provided by the novel coating aids of the present invention when incorporated into water-permeable colloid-containing coating compositions in general and those comprising gelatin in particular, are made readily manifest by reference to the fact that such compounds permit the effective use of coating speeds which at least double those necessarily employed heretofore with the virtual absence of the deleterious effects previously encountered, e.g., skipping. As previously mentioned, the coating of chilled emulsions with surface gelatin layers employing surfactant materials currently provided for such purposes is invariably attended by severe problems of skippingg, such problems becoming more pronounced with the use of higher web coating speeds. It is self-evident, of course, that increased web speeds are vital for increased product throughput. As will thus be recognized, the advantages provided by the present invention when considered solely from an economic standpoint are of the first order of significance.

The coating aids of the present invention can be effectively employed in relatively small concentrations, i.e., on the order of 0.01% and lower by weight based upon the total weight of the coating solution. It will be understood, of course, that larger quantities may be employed to advantage, for example, in amounts ranging up to 0.1 to 2.5% based upon the total weight of coating solution. The particular proportions employed will depend to a large extent upon the ultimate use contemplated for the coating composition in question. Accordingly, the aforementioned concentrations are not particularly critical serving only to define those proportions found in general to yield optimum results. With specific reference to photographic utility, for example, in those instances wherein the gelatin is to be incorporated directly into a photographic silver halide emulsion, the higher concentration ranges will ordinarily be found to be most effective.

The photographic emulsions prepared utilizing the sulfate ester coating aids of the present invention ordinarily comprise an aqueous solution of gelatin containing as the light-sensitive material a silver salt such as silver bromide, silver chloride, silver iodide as well as mixtures thereof. Such emulsions may be of the non-optically sensitized or optically sensitized emulsion. When preparing the photographic emulsion, the glycidol polyether sulfate ester may be added either before or after the addition of any of the other ingredients customarily employed in the manufacture of gelatin silver halide emulsions such as sensitizing dyes, hardeners and the like. The particular coating procedure employed may comprise any of the standard methods promulgated in the industry for such purposes. For example, the substrate to be coated may be passed through a trough or other reservoir containing the coating solution. The coating may be applied to a greater thickness than that desired ultimately and thereafter subjected to the action of suitable leveling means such as a doctor-blade or an air-brush which causes run-back of the coating composition thereby resulting in the obtention of an even surface. In some instances, the coating method may involve a hopper technique in which the thickness of the layer is regulated by the rate at which the coating composition is deposited upon the base, the latter being transported in a direction adjacent thereto.

Moreover, the glycidyl polyether sulfate ester coating aids described herein may be employed to advantage in combination with one or more of the usual surface active materials employed in the coating of gelatin compositions. Such additional surfactant materials include, for example, the Igepons available commercially from the GAF Corporation with typical representatives including sodium, N-methyl-N-oleoyltaurate; sodium, N-methyl-N-capryloyltaurate; sodium - N-methyl-N-palmitoyltaurate, etc., the imidazolinium class of surfactants such as any of those described in U.S. Pat. 2,982,651; the betaines, e.g., cetyl betaine and the like. The aforedescribed mixtures of surfactants are found to be particularly efficacious in connection with coating methods involving "wet-on-wet" applications.

The glycidol polyether sulfate ester surface active materials of the present invention may be readily and conveniently prepared by subjecting the glycidol polyether to esterification with approximately equimolar quantities of any of the known sulfating agents, e.g., a strong acid such as chlorosulfonic, sulfamic or sulfuric, or an inorganic acid anhydride such as sulfur trioxide or an acid halide such as sulfuryl chloride. When a properly substituted acid is employed in the esterification such as amino sulfonic acids, sulfamic acid, ammonium bisulfate, and the like, a salt is directly produced. It will, however, be understood that the sulfate ester coating aids employed in the present invention may be in free acid ester form or in the form of a water-soluble salt thereof, such as the alkali metal, alkaline earth metal, ammonium and amine salts. Such salts may be readily prepared, for example, by neutralizing the free acid ester compound with a suitable basic material such as sodium hydroxide, potassium hydroxide, sodium carbonate, sodium acetate, ammonium hydroxide, ammonia, calcium oxide and hydroxide, magnesium oxide and hydroxide, strontium hydroxide, ethanolamine, diethanolamine, triethanolamine, methylamine, dimethylamine, trimethylamine, ethylamine, triethylamine, diethylamine, butylamine, propylamine, cyclohexylamine, morpholine, pyridine, octanolamine, octylamine, and the like.

The temperature of the sulfating reaction is preferably controlled within a range of about 35° to 65° C. for purposes of facilitating formation of the desired product, temperatures on the order of about 50° C. being found to be eminently suitable for such purposes. Thus, for example, the synthesis of the sulfate ester of the reaction product obtained by the condensation of the glycidol with nonyl phenol can be effected by merely adding the requisite amount of sulfating agent to the nonyl phenol glycidol product while maintaining a temperature of about 50° C. with agitation throughout said addition. It is advisable to provide an inert atmosphere, i.e., a nitrogen blanket over the surface of the nonyl phenol glycidol product during the course of the reaction. The preparatory procedure for the sulfate ester of the glycidol/isononylphenol adduct is illustratively described hereinbelow in Examples IB, IC and ID. Reference is made above to the requisite amount of sulfating agent. Preferably an equimolar amount (yielding the monosulfate ester) is employed, but the requisite amount may be an amount up to about 5 moles and preferably 1–3 moles per mole of glycidol polyether.

The glycidol polyether materials employed for sulfation in accordance with the present invention and methods for their preparation are well known and are disclosed in Belgian Pat. No. 652,862 the disclosure of which is accordingly incorporated herein by reference thereto. Briefly they may be readily and conveniently prepared, for example, by heating glycidol with an alkyl phenol of the following structural formula:

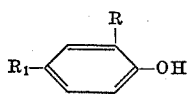

wherein R and $R_1$ have the aforedescribed significance. Suitable alkyl phenols include the following representatives:

p-isononylphenol
p-isododecylphenol
o-p-di-isononylphenol
o-p-di-isododecylphenol
p-tert-octylphenol
o-p-di-tert-octylphenol
p-tert-octyl-o-isononylphenol
p-tert-octyl-o-isododecylphenol
p-sec-octylphenol
p-sec-dodecylphenol
p-sec-hexadecylphenol
p-sec-octadecylphenol
o-p-di-dodecylphenol
p-cetylphenol
p-tert-octyl-o-tert-butylphenol
p-octadecyl-o-cresol
p-iso-nonyl-o-tert-butylphenol, etc.

and mixtures comprising 2 or more of the foregoing. The preparatory procedure for the glycidol/isononylphenol adduct is illustratively described herein below in Example IA.

The reaction of the alkyl phenol and glycidol is preferably effected in the presence of an alkaline-reacting catalyst. Suitable catalysts for such purposes include the alkali metals, their oxides, hydroxides, alcoholates, phenolates, cresolates, etc., as well as mixtures comprising two or more of such materials. Typical examples of the aforedescribed materials include sodium, lithium, potassium, sodium hydroxide, potassium hydroxide, sodium methylate, lithium methylate, sodium isopropylate, sodium octadecylate, sodium phenolate, potassium phenolate, sodium cresolates, etc. The catalyst substance is most effectively employed in concentrations ranging from about 0.1 to about 2% by weight of the reaction mixture. The reaction may be carried out at elevated temperatures ranging from 100° to 200° C. and preferably from 130° to 160° C. The temperature selected in a particular circumstance will quite naturally be influenced somewhat by the reaction rate desired as well as the properties and relative proportions of the reactants.

Since glycidol tends to react with itself and especially under the conditions recommended herein for preparing the glycidol-polyether derivative, it is advisable to add the glycidol to a previously prepared solution containing the desired quantities of alkyl phenol and catalyst. The glycidol addition should be controlled in such manner that the concentration of glycidol in the reaction medium is not allowed to exceed approximately 2% by weight based upon the total weight of the reaction medium. Particularly beneficial results are obtained when the glycidol concentration is maintained at a value approximating 0.5% by weight of the reaction medium.

One of the salient advantages characterizing the sulfate ester derivatives of the present invention relates to their property of being totally inert with respect to the sensitometric characteristics of the silver halide photographic emulsion material. The importance of this particular aspect cannot be emphasized too strongly since any necessity for the conjunctive use of additional ingredients for purposes of compensating for any deleterious effects upon sensitometric properties which would otherwise arise is completely obviated. For example, it has been observed that a substantial number of the surface active materials heretofore promulgated and especially for use with photographic emulsions exhibit a pronounced tendency to adversely affect the sensitometric properties of the emulsion, e.g., the formation of fog, depressed sensitivity levels, etc. In many instances, the fugitive character of such materials can produce intolerable conditions to the extent that the use of added ingredients is made absolutely mandatory whereby to compensate for departures from optimum sensitometric behavior.

A further and significant advantage characterizing the glycidol polyether sulfate esters described herein relates to their property of being readily wetted by hydrophilic media; this is of primary import not only from the standpoint of expeditious coating, i.e., the ready deposition of uniform and repellency-free layers is permitted, but in addition from the standpoint of photographic processing. Thus, problems which might otherwise arise in connection with the obtention of efficient solution-emulsion contacting whereby to promote efficient development are completely eliminated. As will be apparent, the required developing time is correspondingly reduced.

The following examples are given for purposes of illustration only and are not to be considered as necessarily constituting a limitation on the present invention. All parts and proportions referred to herein and in the appended claims are by weight unless otherwise indicated.

EXAMPLE I (A) Preparation of glycidol/iso-nonylphenol adduct

To a glass container provided with a rapid-speed agitator and reflux condenser is added a mixture comprising 220 gms. of technical grade p-isononylphenol (1 mole) and 1 gm. of potassium hydroxide. The mixture is subjected to agitation and heated under a nitrogen atmosphere at a temperature of about 150° C. Approximately 432 gms. (6 moles) of glycidol are introduced into the alkyl phenol reaction mixture over a period of approximately 4½ hours maintaining constant agitation. Incremental additions of potassium hydroxide are made at intervals throughout the course of the reaction in order to maintain a total potassium hydroxide concentration in the reaction mixture approximating its initial value. The terminal point in the reaction is indicated by a negative test for nonylphenol. Upon completion of the reaction, water is added in an amount approximating the total weight of the potassium hydroxide employed. The pH of the reaction media is brought to below 9 by the introduction of carbon dioxide and is thereafter allowed to cool to room temperature whereupon there is obtained a water-soluble, amber, viscous syrup which has the following structural formula:

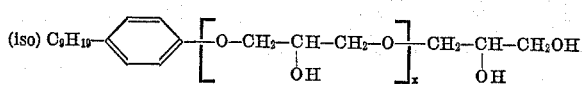

wherein $x$ has an average value of 5. The p-isononylphenol employed in the above example is available commercially and can be readily prepared by the condensation of phenol with tripropylene in the presence of an acid catalyst.

(B) Preparation of sulfate ester utilizing chlorosulfonic acid

The glycidol isononyl phenol product prepared in (A) is converted to the sulfate ester salt according to the following technique. The isononyl phenol glycidol reaction product is heated to a temperature of approximately 45° C. Thereupon chlorosulfonic acid in approximately equimolar amount relating to the glycidol polyether is added while maintaining agitation throughout such addition. The chlorosulfonic acid is added at a rate whereby the temperature of the reaction-mass is maintained at approximately 50° C. until completion of the acid addition. The hydrogen chloride by-product is removed with an inert gas purge. The sulfate ester may then be neutralized by adding it to an equivalent amount of a basic material (in aqueous solution) to yield the sulfate ester salt (e.g. sodium hydroxide).

(C) Preparation of sulfate ester utilizing sulfur trioxide

The glycidol isononyl phenol product prepared in (A) is converted to the sulfate ester salt according to the following technique. The isononyl phenol/glycidol reaction product is heated to a temperature of approximately 45° C. Thereupon sulfur trioxide in approximately equimolar amount relative to the glycidol polyether is carried in via bubbling, with nitrogen while maintaining agitation throughout such addition. The sulfur trioxide is added at a rate whereby the temperature of the reaction mass is maintained at approximately 50° C. until completion of the trioxide addition. The trioxide addition is effected under an inert atmosphere of nitrogen. The sulfate ester may then be neutralized by adding it to an equivalent amount of a basic material (in aqueous solution) to yield the sulphate ester salt (e.g. sodium hydroxide).

(D) Preparation of sulfate ester salt utilizing sulfamic acid

The glycidol isononyl phenol product prepared in (A) is converted to the sulfate ester salt according to the following technique. The isononyl phenol/glycidol reaction product is heated to a temperature of approximately 95° C. Thereupon sulfamic acid in approximately equimolar amount relative to the glycidol polyether is added while maintaining agitation throughout such addition. The acid addition is effected under an inert atmosphere of nitrogen. Upon completion of the acid addition, the temperature of the medium is raised to 115° C. and held at such temperature for a period of 4 hours. The solution is then cooled to 75° C. and monoethanolamine is added to give a product having a pH=7.5–8.0. Water or water-alcohol is added to give a solution of the ammonium salt of the sulfate ester. The concentration is preferably adjusted with water to provide a clear free-flowing homogeneous solution.

(E) Preparation of silver halide photographic emulsion

A coating composition is prepared comprising a gelatin silver halide photographic emulsion having a silver concentration of approximately 35 gms. per kg. of emulsion and a gelatin concentration of approximately 70 gms. per kg. of emulsion. Approximately 0.5% by weight total emulsion composition of the sulfate ester salt described in (D) above is added. The emulsion is thereupon coated onto a cellulose acetate film-base via the air-doctor blade technique at a web coating speed of approximately 150 ft. per minute. During the same coating pass, a surface coating composition comprising a 4% aqueous gelatin layer containing 0.4% by weight of conventional tauride coating aid is coated directly upon the wet, chilled emulsion utilizing the same web speed of 150 ft. per minute. The film sample thus coated is found upon examination to be totally free of defects such as typified by air bells, streaks or other irregularities. In addition, the surface layer exhibited firm-bonding with no tendency to strip, peel or otherwise separate from the subjacent silver halide layer.

By way of comparison, the above-described procedure is repeated but utilizing saponin as the sole surface active agent. In this particular instance, coating speeds of up to approximately 45 ft. per minute only were permitted; attempts to increase the web coating speed beyond this value are vitiated by severe problems of skipping, i.e., the surface coating layer failed to wet the silver halide layer with the consistency and uniformity required.

EXAMPLE II

Example I(E) is repeated except that the coating aid material comprises the sulfate ester salt of the reaction product obtained by the condensation of glycidol with p-isododecyl phenol. Sulfation is carried out in the manner described in Example I(D). Incorporation of the sulfate derivative into a photographic silver halide emulsion composition and coating according to the procedure described in Example I is found to provide similar results, i.e., coating speeds of 150 ft. per minute are effectively employed whereby to provide a coated film element totally devoid of objectionable defects.

The glycidol-p-isododecyl phenol adduct is prepared utilizing the following procedure and proportions of reactants:

|  | Gms. |
|---|---|
| Glycidol | 173 |
| p-Isododecylphenol | 88.5 |
| Potassium metal catalyst | 0.24 |

The total quantity of glycidol is added to the alkyl phenol-catalyst mixture over a period of approximately 3 hours maintaining constant agitation. Upon completion of the reaction, there is obtained a water-soluble semi-solid and highly viscous compound which has the following structural formula:

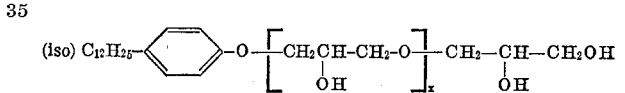

wherein $x$ has an average value of 6.

EXAMPLE III

Example I(E) is repeated except that the coating aid employed comprises the sulfate ester salt of the reaction product obtained by the condensation of glycidol with o-p-di-isononylphenol. The latter material is prepared utilizing the following procedure and proportions of reactants:

| Glycidol | moles | 18.4 |
|---|---|---|
| o-p-Di-isononylphenol | do | 1 |
| Potassium metal | gm | 1 |

The glycidol is added to the alkyl phenol-catalyst mixture over a period of approximately 8½ hours maintaining constant agitation. Upon completion of the reaction there is obtained a water-soluble, semi-solid, highly viscous product of the following structural formula:

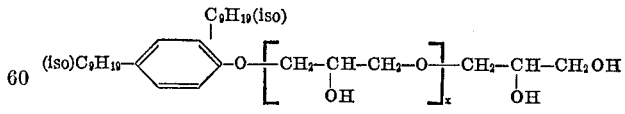

wherein $x$ has an average value of approximately 17.4.

EXAMPLE IV

Example I(E) is repeated except that the coating aid employed comprises sulfate ester salt of the reaction product obtained by the condensation of glycidol with p-tert-octylphenol. The latter material is prepared utilizing the following procedure and proportions of reactants:

| Glycidol | moles | 5.5 |
|---|---|---|
| p-Tert-octylphenol | do | 1 |
| Sodium metal catalyst | gm | 0.8 |

The glycidol is added to the alkyl phenol-catalyst mixture over a period of approximately 4 hours maintaining constant agitation throughout the addition. Upon completion of the reaction there is obtained a water-soluble, viscous syrup which analysis establishes to have the following structural formula:

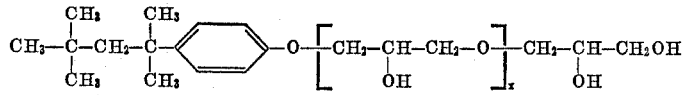

wherein $x$ has an average value of approximately 4.5.

In each of Examples III and IV, the coated elements obtained, i.e., photographic emulsion layer having a gelatin surface coating deposited directly thereupon, displayed no coating defects having excellent structural stability.

As previously indicated, the glycidol polyether sulfate ester surface active agents described herein may be utilized in combination with one or more of the more conventional surface active agents such as the imidazolinium compounds described in U.S. Pat. 2,982,651, e.g., Monosodium salt of 2-undecyl-1-carboxymethyl-1-hydroxyethyl-imidazolinium hydroxide
Monosodium salt of 2-heptadecyl-1-carboxymethyl-1-hydroxyethyl-imidazolinium hydroxide
Disodium salt of 2-pentadecyl-1-carboxymethyl-1-hydroxyethyl-imidazolinium hydroxide
Disodium salt of 2-pentadecyl-1-carboxymethyl-1-hydroxyethyl-imidazolinium hydroxide
Monosodium salts of 2-nonyl-1-carboxymethyl-1-hydroxyethyl-imidazolinium hydroxide
Disodium salt of 2-heptadecenyl-1-carboxymethyl-1-hydroxyethyl-imidazolinium hydroxide
Disodium salt of 2-undecyl-1-carboxymethyl-1-(8-carboxy-methyl-oxethyl)-imidazolinium hydroxide, etc.

It will further be understood that the nature of the additional surface active material is not a particularly critical factor in the practice of the present invention since any of the compounds conventionally employed in this regard may be used. For example, similar increases in coating speed are obtained with the use of, as additional surface active materials, protein condensation products of fatty acids, saponin, polyoxyethylene derivatives of long chain fatty acids, alcohols, etc., sulfated oleic acid, dihexyl ester of sodium sulfosuccinate, sodium salt of an alkylnaphthalene sulfonic acid, sodium salt of tetrahydronaphthalene sulfonic acid, calcium glycerin phosphate, alkylphenylpolyethylene glycol, oleic acid ester of hydroxyethane sulfonic acid and sulfonates of high molecular weight primary or secondary aliphatic, aromatic and cycloaliphatic carboxy acids and the like.

Furthermore, the above described improvements are obtained whether the additional surface active material be of the non-ionic, anionic, amphoteric and/or cationic variety.

The improvements provided by the present invention are also obtained with silver halide emulsions which contain color formers which are provided with a solubilizing sulfo or carboxy group, and therefore, soluble in alkali solutions, for instance, sodium hydroxide solutions. Such color formers which upon color development with a primary amino developer yield azomethine, quinonimine or azine dyes, are described in U.S. Pats. 2,186,734; 2,445,-252; 2,530,349; 2,671,021; 2,524,725; 2,354,552 and 2,547,037.

The color coupler may be of the non-diffusing type which, when added to the silver halide emulsion dispersed in a mixture of high boiling and low boiling solvents, forms packet-type emulsions with capsulated color formers. Such color formers are known to persons skilled in the art. Typical representatives are described in U.S. Pats. 2,186,852; 2,179,239; 2,179,244; 2,298,443; 2,369,-489 and 2,511,231.

Although the present invention has been particularly described with reference to the preparation of photographic silver halide emulsions, it will be understood that the coating compositions provided by the present invention may comprise simply a mixture of gelatin or other water-permeable colloid with one or more of the sulfate ester coating aids. Such compositions find utility in a wide variety of applications and may be applied as such to any number of substrate materials for purposes of providing a suitable overcoat. For example, they may be employed to advantage as protective coatings for paper, plastics such as films of cellulose nitrate, cellulose esters, e.g., cellulose acetate, cellulose acetate butyrate and the like. In addition, they may be applied in the form of antihalation layers, antistatic layers, filter layers or in any type of gelatin layer which is coated from a composition consisting essentially of an aqueous solution of gelatin. For example, gelatin coating compositions intended for use as auxiliary layers, surface layers, etc., will usually contain the gelatin in amounts approximately 2% to 3% by weight of the total composition. However, when employed in the preparation of photographic emulsions, it is usually advisable to employ larger proportions of coating aid than would customarily be employed in aqueous solutions of gelatin intended for use as simple overcoatings. Moreover, in some instances, it may be advantageous to employ larger proportions even though the coating composition in question is intended for use as a simple auxiliary, i.e., non-image forming layer since, in general, larger concentrations are found to permit the more effective use of higher coating speeds. In general, increased proportions of coating aid are usually desirable where the gelatin is employed in minor concentrations. The pH of the coating composition would ordinarily fall within a range of about 5 to 8. If applied as an auxiliary layer, e.g., as a non-curling layer in a photographic film element, an acid pH range is usually preferred.

This invention has been described with respect to certain preferred embodiments and there will become obvious to persons skilled in the art other variations, modifications, and equivalents which are to be understood as coming within the scope of the present invention.

For instance, excellent results have been obtained with a sulfate ester of a glycidol polyether having the following structure:

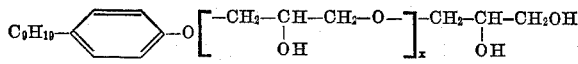

wherein $x$ has an average value of 10.

Besides, conventional suface active agents other than the specifically listed materials of U.S. Pat. 2,982,651 may be used. Among them are the surfactants described in U.S. Pat. 3,133,816 (Ben-Ezra to GAF) which are the water-soluble salts of N-alkyl-β-aminopropionic acid.

What is claimed is:

1. A coating composition comprising: a water permeable colloid and a coating aid therein, said coating aid being the reaction product of a sulfating agent and a glycidol polyether of the following structural formula:

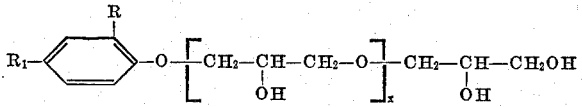

wherein R represents hydrogen or alkyl containing from 1 to 18 carbon atoms, $R_1$ represents alkyl containing from 8 to 18 carbon atoms and X represents a positive integer of from 3 to 30, inclusive, said sulfating agent being selected from the group consisting of chlorosulfonic acid, sulfamic acid, sulfuric acid, sulfur trioxide ammonium bisulfate, sulfuryl chloride and amino sulfonic acid.

2. A composition as defined in claim 1 wherein said reaction product is present from about 0.01 to 2.5% by weight of said composition and wherein said sulfating agent is employed in an amount of 1-5 moles of sulfating agent per mole of said glycidol polyether.

3. A composition as defined in claim 1, wherein said glycidol polyether has a structural formula selected from the group consisting of;

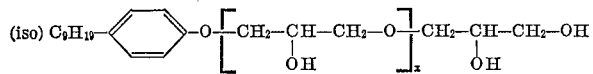

wherein $x$ has an average value of 5,

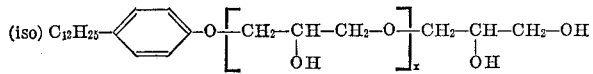

wherein $x$ has an average value of 6,

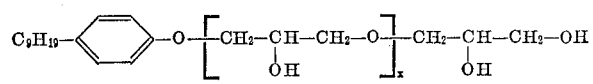

wherein $x$ has an average value of 10,

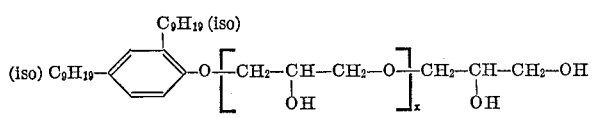

wherein $x$ has an average value of approximately 17.4 and

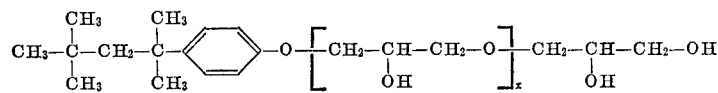

wherein $x$ has an average value of approximately 4.5.

4. A composition according to claim 1, wherein said coating aid is the ammonium salt of said reaction product.

5. An article of manufacture comprising a support coated with the composition of claim 1.

6. A photographic silver halide emulsion containing therein, as a coating aid from 0.01 to 2.5% by weight of said emulsion of the reaction product as defined in claim 1.

7. A multi-layer, light-sensitive photographic element wherein at least one layer formed from a coating solution comprises a water-permeable colloid and 0.01 to 2.5% by weight of said layer of the reaction product as defined in claim 1.

8. A photographic element as defined in claim 7 wherein at least one of the layers containing said coating aid comprises a light-sensitive silver halide emulsion layer.

9. A process of the treatment of an exposed silver halide emulsion which comprises developing said emulsion following exposure in the presence of a small amount of the reaction product as defined in claim 1.

10. An article of manufacture comprising a flexible plastic support carrying at least one photographic silver halide emulsion layer and being provided with a layer coated from the composition specified in claim 1, wherein said glycidol polyether has the following structural formula:

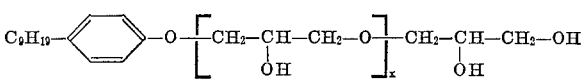

and wherein $x$ has an average value of 10.

References Cited

UNITED STATES PATENTS

| | | | |
|---|---|---|---|
| 3,397,988 | 8/1968 | Paesschen | 96—114 |
| 3,514,293 | 5/1970 | Knox | 96—114.5 |

FOREIGN PATENTS

| | | | |
|---|---|---|---|
| 39,621 | 6/1965 | Germany. | |
| 808,228 | 1/1959 | Great Britain | 96—94 |

J. TRAVIS BROWN, Primary Examiner

J. R. HIGHTOWER, Assistant Examiner

U.S. Cl. X.R.

96—67; 106—125